INVENTORS
ERIC W. LEAVER
GEORGE R. MOUNCE

THEIR ATTORNEY

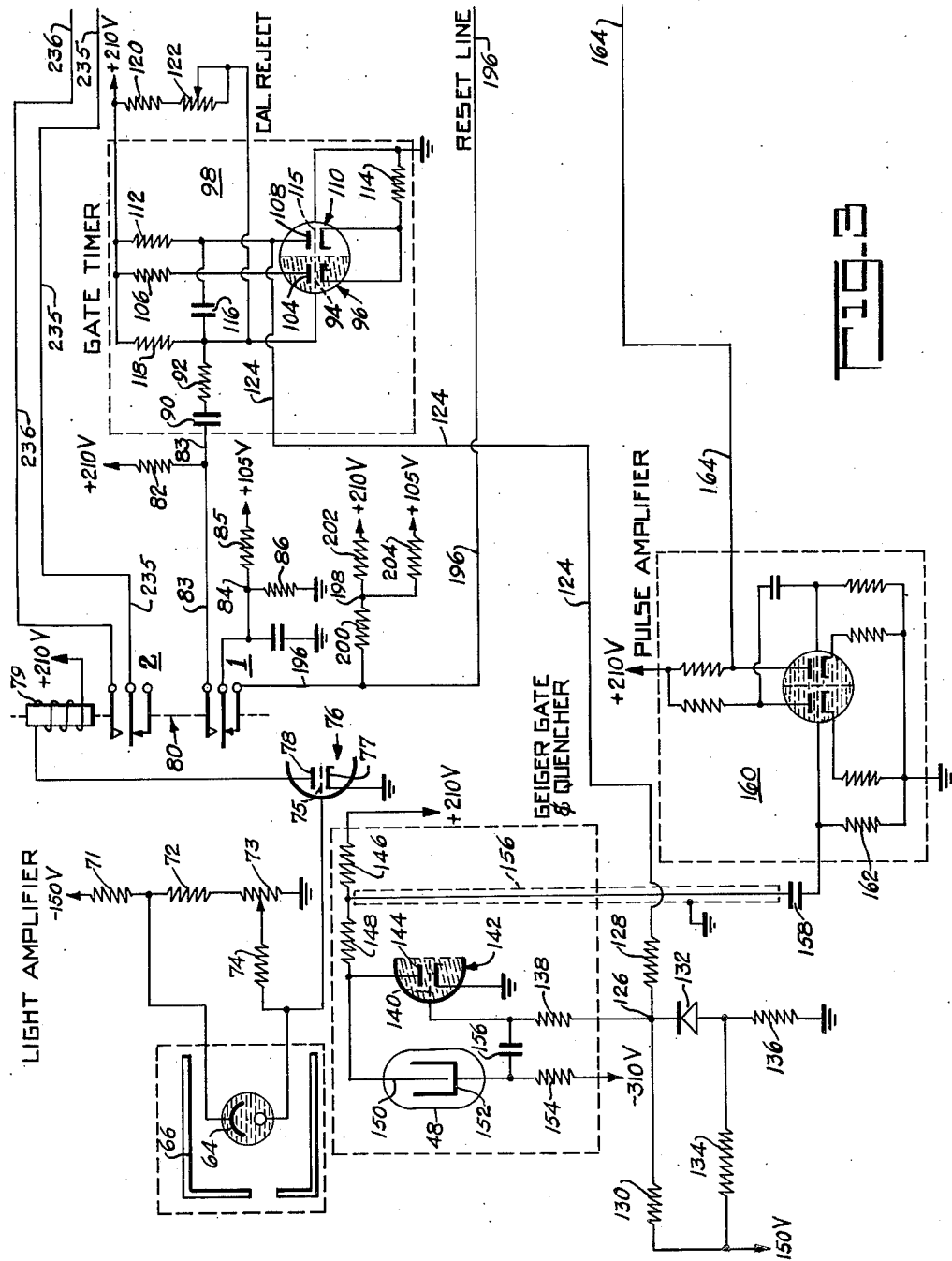

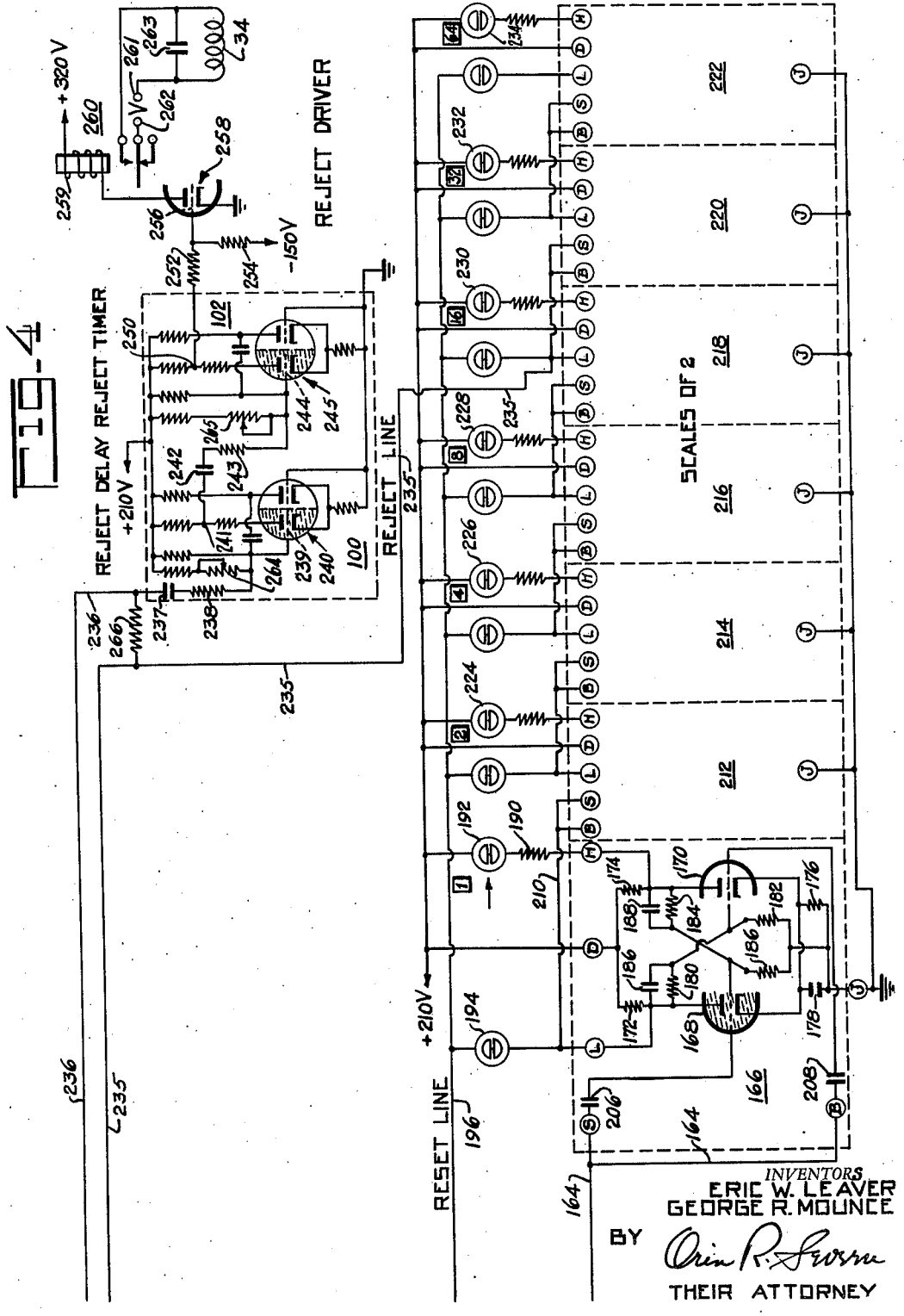

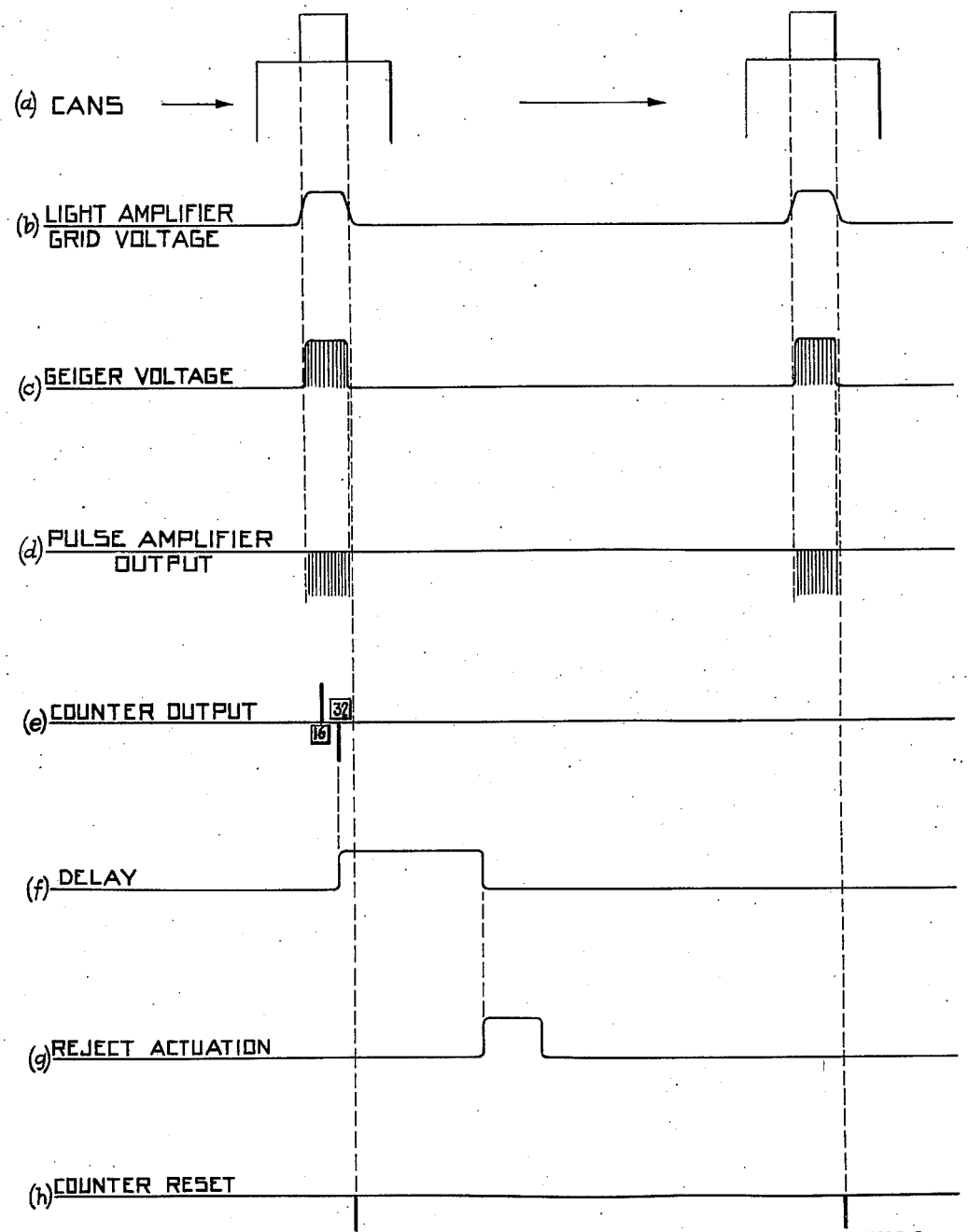

United States Patent Office 3,038,606
Patented June 12, 1962

3,038,606
AUTOMATIC LEVEL INSPECTOR
Eric W. Leaver and George R. Mounce, both of Willowdale, Ontario, Canada, assignors to Electronic Associates Limited, a Canadian company
Filed Apr. 18, 1957, Ser. No. 653,570
4 Claims. (Cl. 209—111.5)

This invention relates to apparatus for inspecting the level of contents of cans or packages, and has particular application to level inspection of cans filled at high rates and conveyed at high speeds.

Level measuring apparatus heretofore known generally falls into one of two categories. The first category of devices utilizes photoelectric means for top level inspection of an open can or side level inspection in the case of transparent cans. A light beam with an intensity variable in accordance with variation in the level of the can contents is detected by a photoelectric cell and an electrical signal potential representative in its magnitude of the level of can content is produced, amplified and caused to operate a meter and, in the event that the contents of a given can is below an acceptable level, a rejection mechanism. Top level inspection usually results in very poor measurement accuracy. Many types of packages can never be opened at the top, nor can they be transparent, rendering photoelectric inspection means useless. The second category of devices employs an X-ray tube and an X-ray detector for receiving radiation unabsorbed by the can and with an intensity variable in accordance with variations in level of the can contents. The devices of this kind are not limited to open top packages or transparent packages, but otherwise they operate much in the same manner as the photoelectric devices. An electrical signal potential is produced having a magnitude in accordance with the detected radiation and a level indicating meter and rejection means are operated in similar manner. A disadvantage of X-ray apparatus arises out of the bulky and expensive high voltage power supplies necessary therefor. A further drawback common to both photoelectric and X-ray level inspecting apparatus is the high rate of improper rejection of acceptable cans, particularly full cans, and also the improper non-rejection of non-acceptable cans, particularly empty cans. This limitation of both photo-electric and X-ray level measuring apparatus is inherent in "analog" operation, wherein the magnitude of an electrical signal controls the meter indication and also the rejection mechanism. Analog devices are subject to "memory" effects, i.e. information pertaining to a particular can is not cleared in sufficient time for representation of the level of the next ensuing can. Improper rejection and improper non-rejection are the consequence of the slowness in response of photoelectric and X-ray analog apparatus and this problem has become very severe with the advent of high speed canning machinery and high speed conveyors.

It is an object of the invention to provide level inspecting apparatus having a high degree of accuracy in indication of the level.

Another object of the invention is to provide level inspecting apparatus with an extremely low probability of improper rejection and improper non-rejection even at high canning rates and high conveyor speeds.

These and other objects of the invention are attained by resort to digital rather than analog means for level measurement. A radiation counter tube produces during a predetermined limited time interval pulses at a high rate compared to the canning rate and conveyor speed. Moreover the duration of the pulses is substantially instantaneous as compared to the canning and conveyor events and the pulse information is capable of being cleared substantially instantaneously. Photoelectric means are employed to gate the operation of the radiation counter tube for the aforesaid predetermined period during the interception of the radiation by a can, and the number of pulses produced during this interval is representative of the level of the can content. The pulses control the operation of a digital indicator also with a substantially instantaneous response, and the indicator is also capable of rapid clearing. Means are provided for rejecting non-acceptable cans in the event the number of pulses produced during the specified time interval has exceeded a predetermined maximum number. Means are provided to clear the indicator and the rejection mechanism of the pulse information in ample time prior to the production of pulses representative of the level of the next can. The photoelectric gating means serve additionally to prolong the life of the radiation counter tube and in furtherance of this object a novel combined gating, quenching and amplifying circuit is provided for shortening the duration of the pulses produced. The quench circuit is effective with self-quenching radiation counter tubes as well as with non-self-quenching tubes, either of which types may be employed according to the invention.

For a better understanding of the invention reference may be had to the following more detailed description considered together with the accompanying drawings in which.

FIGS. 3 and 4 form a single schematic representation of the measuring, and rejection circuitry;

FIG. 5 is an illustration of the waveform-time relations of some of the circuit elements in FIGS. 3 and 4.

Figure 1:
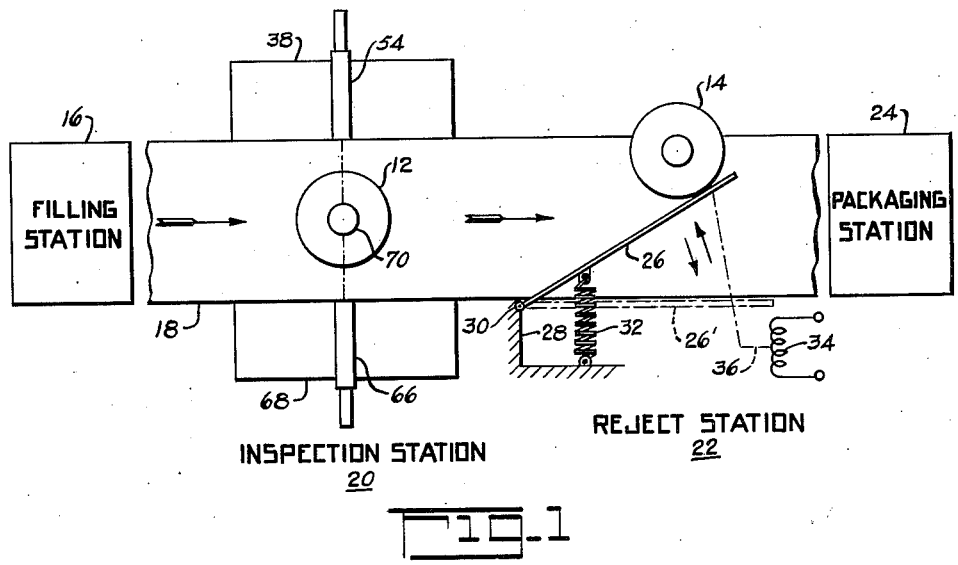
FIG. 1 is partly a top plan view and partly a diagrammatic illustration of inspection and rejection apparatus.

Referring to FIG. 1, opaque or transparent containers or cans such as 12 and 14 are transported in upright position from a filling station 16 by a conveyor belt 18 past an inspection station 20 and a reject station 22 to a packaging station 24. The can contents may be liquids, emulsions or even solids, for example in the form of powder, provided that they have a reasonably plane surface. By way of example it will be assumed that the particular content discussed hereinafter is an emulsion of soap. This is inserted into the cans at the filling station 16 and the cans are also sealed thereat. Upon arrival at the packaging station 24 the cans are packaged in boxes, crates, etc. Certain of the cans may be found at the inspection station 20 to have a content below an acceptable level and are therefore rejected from the conveyor belt 18 at the reject station 22 by suitable means such as a deflecting arm 26 which places a bar to the travel of the rejected can 14 and causes it to be pushed off the conveyor belt into a collecting bin (not shown).

The deflection arm 26 is pivotally mounted on a frame 28 at its end 30 and is normally held in the position indicated by 26', i.e. not impeding the can travel, by means of a tension spring 32 secured at its ends respectively to the frame 28 and to the arm 26 intermediate the ends thereof. If a can such as 14 had been found to be non-acceptable at the reject station, a reject solenoid 34 is energized and by means of mechanical and magnetic connections generally indicated at 36 drives the deflection arm 26 into the path of travel of the particular nonacceptable can 14 against the tension of spring 32 for a predetermined time interval sufficiently long to reject the can 14 and also sufficiently short to assure that the next succeeding can will not be rejected if it is acceptable.

Figure 2:
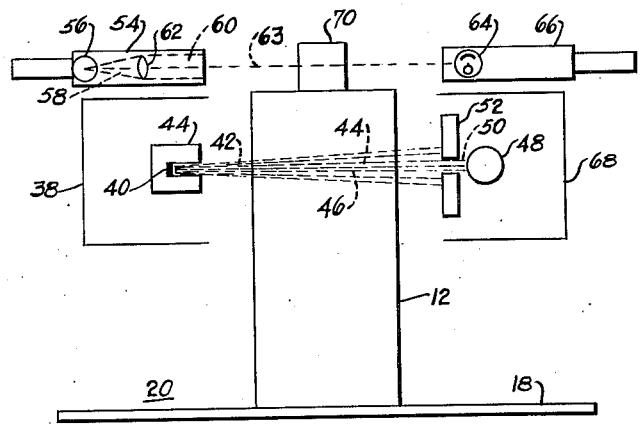
FIG. 2 is partly a front elevation and partly a diagrammatic illustration of the apparatus shown in FIG. 1.

Referring also to FIG. 2 the inspection apparatus comprises a housing 38 containing a source of penetrative radiation 40, preferably a source of beta radiation such as strontium 90 which emits a beam 42 of high speed electrons. The source 40 is disposed within a collimator 44 which limits the beam scatter to a relatively small angle as shown. The beam 42 is directed transversely to the travel of the cans and is intercepted by the cans. The central portion of the beam designated by the lines 44 and 46 reaches a self-quenching or non-self-quenching Geiger-Mueller tube 48 through an opening 50 of a second collimator 52, causing the Geiger tube 48 to produce count pulses representative of the level of soap. The remaining portions of beam 42 on the outside of lines 44 and 46 are absorbed by the collimator 52. The line 46 represents the limit of acceptable cans; a level above the line 44 represents a "full" can; a can level intermediate of the lines 44 and 46 is regarded as acceptable.

The apparatus operates on the principle that the absorption of radiation by the soap within the can is high whereas the absorption by air above the soap level is low. As a consequence a "full" can will give a rise to but a few Geiger pulses for a given time interval and a nonacceptable can will give rise to a large number of Geiger pulses for the same time interval. A can having a level lower than "full" but higher than "non-acceptable" will give a rise to a number of Geiger pulses in accordance with the difference in level below "full." Bewteen these limits of lines 44 and 46 the relation of pulses generalted to liquid level is substantially linear, though of course level increments or decrements are indicated in discrete digital steps.

As is well-known, Geiger tubes have a life limited to a finite number of pulses produced and therefore means are provided to inhibit the operation of the Geiger tube 48 except during a limited time interval of level measurement for each can. The inhibiting means includes a second housing or camera 54 disposed centrally above the radiation source housing 38. A light source 56 is disposed within the camera 54 and emits a diverging light ray 58 which is refracted to a parallel light beam 60 by means of a lens 62. Only a thin ray 63 of almost line thickness emerges from an opening in the housing 54 and is directed at a photoelectric cell 64 in a housing 66 disposed centrally above the Geiger tube housing 68, which in turn is disposed opposite the radiation active source housing 38. The ray 62 normally renders the photocell 64 emissive or conductive, but upon its interception by a can filler 70 the cell is rendered non-conductive. The photocell 64 is connected to the Geiger tube 48 by circuit means for inhibiting and enabling Geiger tube operation according to whether the photocell 64 is conductive or non-conductive.

Such circuit means are shown in FIGS. 3 and 4 wherein the tubes normally conducting and normally non-conducting may be ascertained by inspection. Each of the former group of tubes is shown hatched and each of the latter group is shown clear. In the case of vacuum tubes a further convention is adopted: The tubes biased for plate current saturation are shown as diagonally hatched whereas tubes biased for class A or class AB operation are shown as horizontally hatched. The "normal" condition of each tube is that condition which would exist were no cans transported on the conveyor belt 18. This is also the condition of the tubes when cans are in fact transported by the conveyor belt 18 but the light ray 62 is not intercepted by a filler 70. Since the relays shown in FIGS. 3 and 4 are connected in the plate circuits of normally nonconducting tubes the usual convention of normally open and normally closed contacts is consistent with "normalcy" as defined before. The relay contacts are accordingly shown to "make" circuits through the NC contacts.

Referring to FIGS. 3 and 4 there are connected from a negative direct voltage supply point −150 v. to ground in order, series connected resistors 71, 72 and 73. Resistor 73 is adjustable for control of sensitivity of the photocell and its wiper arm is connected through a resistor 74 to the cathode of the photoelectric cell 64, which cathode is also conductor connected to the grid 75 of a normally non-conducting light amplifier triode 76. The anode of photocell 64 is conductor connected to the junction of resistors 71 and 72. With phototocell 64 normally conducting, resistor 72 and the upper portion of resistor 73 are shunted by the photocell and resistor 74 and the potential of grid 75 is sufficiently negative with respect to the grounded cathode 77 to cut triode 76 off. When the light ray 63 incident upon the photocell is broken by a filler 70, its emission ceases and the photential of grid 75, though still negative, is raised sufficiently to render triode 76 conducting. This is indicated graphically in FIG. 5b. The first and second cans in FIG. 5a are assumed to be respectively non-acceptable and acceptable.

The plate current of triode 76 flows to its anode 78 through the coil 79 of a relay 80, the other end of coil 79 being connected to the positive direct supply voltage source +210 v. The flow of plate current causes relay 80 to pick up. Prior to its energization its No contact 1 had been at a potential of +210 v. supplied through the high value resistor 82 and line 83. Upon energization of relay 80 the potential of the No contact 1 of relay 80 and also of line 83 is reduced to +70 volts with respect to ground, supplied thereto from a circuit junction 84 which is conductor connected to the movable contact 1 of relay 80. Ends of low value resistors 85 and 86 are joined at the junction 84 and the other ends of these resistors are connected respectively to the positive direct supply voltage source +105 v. and ground. Because of the low value of resistors 85 and 86 the potential of the movable contact 1 of relay 80 is substantially independent of the state of energization of relay 80 and is substantially unaltered by the loading effect of resistor 82 attendant to the energization of relay 80. With the drop in voltage on line 83 from +210 v. to +70 v. a negative pulse is generated on line 83 which is differentiated by means of capacitor 90 and resistor 92 connected in series with line 83. The differentiated pulse is fed to the grid 94 of the normally conducting tube 96 of gate timer one-shot multivibrator 98. The negative spike corresponding to the leading edge of the pulse lowers the potential of grid 94 below saturation potential and triggers the timing action of the one-shot multivibrator 98.

The one-shot multivibrator 98 is typical also of two other one-shot multivibrators 100 and 102 discussed hereinafter. The anode 104 of the normally conducting tube 96 is connected through a resistor 106 to the +210 v. line and the anode 108 of the normally nonconducting tube 110 is connected through a resistor 112 to the +210 v. line. The cathodes of tubes 96 and 110 are connected together and through a resistor 114 to ground thereby providing cathode coupled operation. The grid 115 of the normally non-conducting tube 110 is grounded. The duration of the timing interval is determined by a capacitor 116 connected between the anode 108 of the normally nonconducting tube 110 and the grid 94 of the normally conducting tube 96 and also by the equivalent resistance of the parallel combination of a resistor 118 connected between grid 94 and the +210 v. line and of the series combination of resistors 120 and 122 shunting resistor 118. Resistor 122 is adjustable for purposes of controlling the duration of the multivibrator timing. Adjustment of the "calibrate reject" resistor 122 serves to calibrate the number of pulses of the Geiger tube 48 corresponding to acceptable and non-acceptable cans.

With arrival of the aforementioned negative trigger spike at the grid 94, the multivibrator 98 operates in well-known manner, causing the potential of the anode 108 to drop from +210 v. to a lower positive value for the duration of the timing interval, thereby producing a negative pulse on line 124 connected to anode 108, which as will be seen gates the Geiger tube 48. The negative gate pulse is attenuated at the circuit junction 126 by reason of the voltage division between resistors 128 and 130, one end of each of which is connected to the circuit junction 126 and the other ends of which are respectively connected to line 126 and the negative direct voltage source −150 v. Moreover, the lower excursion of the pulse is limited to a level of −10 volts by means of the clamping diode 132, whose anode is tied to the junction 126 and whose cathode is at a potential of −10 volts obtained by the voltage division of a resistor 134 connected between the −150 v. source and the cathode of diode 132, and of resistor 136 connected between said cathode and ground.

There is also connected to the circuit junction 126 an end of a grid leak resistor 138 whose other end is connected to the grid 140 of a normally saturated triode 142, which serves as a combined gate, quencher and amplifier for the Geiger tube. The cathode of triode 142 is grounded. Normally the potential of the circuit junction 126 is +12 volts, the potential of the grid 140 is 0 volt, and the potential of the anode 144 of triode 142 is about +40 volts due to the heavy flow of plate current from the +210 v. line throught resistors 146 and 148 connected therefrom to the anode 144. The anode 150 of the Geiger tube 48 is conductor connected to the anode 144 of the triode 142 and is therefore also normally at a potential of about +40 volts. The cathode 152 of the Geiger tube 48 is connected through resistor 154 to a negative direct voltage source −310 v. and is normally at this potential. The cathode is also signalwise coupled to the grid 140 by means of a capacitor 156.

The normal net anode to cathode potential of the Geiger tube 48 of 350 volts is below the Geiger striking voltage and normally no Geiger pulses are produced. The negative pulse appearing at the junction 126 responsive to interception of the light ray 62 by a filler 70 is transmitted by a resistor 138 to the grid 140 and also through capacitor 156 to the cathode 152, driving tube 142 to below cutoff, raising the potential of anodes 144 and 150 to +210 volts, which appears as a positive pulse at said anodes with a duration substantially the same as the negative pulse of the gate timer 98. Initially the cathode of the Geiger tube drops below −310 v. owing to the transmission of the negative pulse through capacitor 156. This coupled with the rise of the potential of the anodes 144 and 150 to +210 volts results in an anode to cathode potential for the Geiger tube exceeding striking potential. Accordingly, Geiger pulses are generated which have positive leading edges at cathode 152 and negative-leading edges at anode 150. Each positive cathode Geiger pulse is transmitted from cathode 152 through capacitor 156 to the grid 140 and causes momentary conduction of tube 142 again, so that the negative pulse at the anodes 144 and 150 due to Geiger action alone is regeneratively amplified due to the Class C amplifying action of tube 142. Each Geiger pulse appears as an amplified negative pulse of about 25 volts magnitude in an envelope of the positive gate pulse appearing at anodes 144 and 150, as shown in FIG. 5c. The 25 volt drop coupled with the corresponding potential rise at the cathode 152 is sufficient to cause momentary quenching or extinction of the Geiger action. Upon each extension the anode to cathode potential of Geiger tube 48 reverts to above striking potential and the next Geiger pulse is produced and immediately extinguished. Alternate pulse generation and immediate extinction is repeated for the duration of the gate pulse from the multivibrator 98, whereafter Geiger operation is once more inhibited with tube 142 reverting to the normal saturated condition. The pulse of multivibrator 98 thus serves to gate operation of the Geiger tube 48 through the intervening means of triode 142 and associated circuitry and triode 142 also serves to quench and amplify the Geiger pulses. The number of Geiger pulses during the gate time interval is of course dependent on the radiation received by the Geiger tube 48, which in turn is dependent on the soap level in the can as previously explained.

The Geiger pulses and their envelope are picked off from the junction of resistors 146 and 148 and fed through a shielded cable 156 and capacitor 158 to the input of a two stage resistance-capacitance coupled pulse amplifier 160. The grid leak resistor 162 and capacitor 158 connected thereto are selected to have a time constant sufficiently short to filter out the envelope of the Geiger pulses while fully transmitting the Geiger pulses themselves, as shown in FIG. 5d. The Geiger pulses appear as amplified negative triggers and have an amplitude of about 100 volts at the output of the pulse amplifier 160, from which they are fed over line 164 to input terminals S and B of the first stage 166 of a cascade of stages of scales of 2 or binary scaler or divider circuits.

The first stage 166 of the scales of 2 is shown in detail whereas the remaining stages are indicated in block form with like-labeled terminals being connected to corresponding circuit points and performing like functions. Stage 166 comprises a well-known Eccles-Jordan type bi-stable trigger or flip-flop circuit. The left tube 168 is the normally conducting, saturated tube whereas the right tube 170 is the normally non-conducting, cut-off tube. The anodes of triodes 168 and 170 are connected respectively through like resistors 172 and 174 to a terminal D which in turn is conductor-connected to the +210 v. line. The cathodes of triodes 168 and 170 are tied together and connected through a resistor 176 and by-pass capacitor 178 to a terminal J and thence to ground. A voltage divider consisting of resistors 180 and 182 is connected between the anode of tube 168 and terminal J and the grid of the normally non-conducting tube is tied to the tap of this voltage divider. A similar voltage divider is connected between the anode of the normally non-conducting tube 170 and terminal J. It consists of the resistors 184 and 186 with the grid of the normally conducting tube 168 connected to the junction of the last-mentioned resistors. The low anode potential of triode 168 is thus transmitted to the grid of tube 70 assuring that the latter shall be cut off and consequently have a high anode potential which in turn is coupled back to the grid of tube 168, assuring in turn its conduction and low anode potential. Means, subsequently described, are provided to set and reset each scale of 2 to the normal condition. The resistors 180 and 184 are shunted by speed-up capacitors 186 and 188 respectively. The anode of the normally conducting tube 168 is connected to a terminal L and the anode of the normally non-conducting tube 170 is connected to a terminal H. A resistor 190 in series with a neon light 192 is connected between the terminal H and the +210 v. line for purposes of visual indication of Geiger pulse counts, and similar resistor-neon light combinations are provided at the terminals H of the subsequent scales of 2. A reset neon light 194 is connected between terminal L and a reset line 196 and and similar neon lights are connected between the reset line 196 and the terminals L of the subsequent stages of the scales of 2.

Normally neither the indicator neon tubes (as typified by 192) nor the reset neon tubes (as typified by 194) are lit. This is so, because the normal anode potential of the non-conducting tubes is approximately +210 v., so that the normal potential across the neon tube 192 is approximately zero. The normal potential of the reset line 196 is +70 volts derived from NC contact 1 of the light relay 80 and from the circuit junction 84 whose potential is +70 volts as previously discussed. The normal value of +70 volts on the reset line is not sufficiently below the normal potential at the terminals L of approximately +100 volts to cause lighting of the reset neon tubes. Upon energization of the light relay 80 the potential of the reset line 196 is changed to +150 volts derived from the circuit junction 198 through the high value resistor 200 connected to the junction 198 and reset line 196. Junction 198 provides voltage division between resistors 202 and 204 whose other ends are connected respectively to the +210 v. line and a source of direct positive potential +105 v. The potential differential between +150 volts on the reset line and +100 volts on terminal L is likewise insufficient to cause lighting of the reset neon tubes.

The grid of the normally conducting tube 168 is connected to terminal S of stage 166 through a differentiating condenser 206 and the grid of the normally nonconducting tube 170 is tied to terminal B of stage 166 through a similar differentiating condenser 208. The terminal L of stage 166 is connected by line 210 to the terminals B and S of the next stage of the scales of 2, 212. Similarly terminal L of stage 212 is conductor connected to terminals B and S of the third stage of the scales 2, 214; the terminal L of stage 214 is connected to terminals B and S of the fourth stage 216; terminal L of stage 216 is connected to terminals B and S of the fifth stage 218 whose terminal L is in turn connected to terminals B and S of the sixth stage 220; the terminal L of stage 220 is in turn connected to the terminals B and S of the seventh and last stage 222. The tubes in the scales of 2 are so biased as to respond to negative triggers only. Thus when the first negative Geiger pulse arrives on line 164 it is applied simultaneously through differentiating condensers 206 and 208 to the grids of tubes 168 and 170 respectively. This first Geiger pulse does not affect the normally nonconducting tube 170 directly, as its grid is already below cut-off potential. It does however lower the potential of the grid of tube 168, decreasing its plate current and initiating the well-known regenerative "flipping" action. The potential at the anode of tube 168 rises to approximately +210 volts, but with the reset line at +150 volts the reset neon tube 194 still does not light. The rise at terminal L of stage 166 to +210 volts is transmitted over line 210 to the terminal B and S of stage 212 whence it is fed to the grids thereof through differentiating condensers. No flipping action occurs in stage 212 as the grids thereof do not respond to positive triggers.

With the triggering by the first Geiger pulse the potential at the anode of tube 170 drops to approximately +100 volts, which is sufficient to light neon tube 192, signifying count 1. The second Geiger pulse is applied through terminal S and capacitor 206 and through terminal B and capacitor 208 to respectively the grids of tubes 168 and 170. It produces no direct effect on tube 168, but does trigger tube 170 and flips stage 166 over, the tubes 168 and 170 reverting to their normal condition. This extinguishes the neon tube 192 once more; also the drop in potential of terminal L of stage 166 is transmitted over line 210 to the terminals B and S of the stage 212 and for the first time produces flipping action therein, causing the indicator neon tube 224 connected to the terminal H thereof to light, signifying count 2. The attendant rise in potential at the terminal L at stage 212 is transmitted to the third stage 214 but produces no flipping action as this stage likewise does not respond to positive triggers.

Upon arrival of the third Geiger pulse, stage 166 flips over once more, causing the neon tube 192 to light, but the second stage 212 is unaffected as it is not responsive to the positive trigger derived from the terminal L of stage 166. As a result both neons 192 and 224 are lit indicating a count of 3. The operation of all of the stages of the scales of 2 will now be apparent to those skilled in the art, and no further detailed discussion is deemed necessary. Suffice it to state that indicator neon tube 192 lights on each odd numbered count and is extinguished at each even numbered count; indicator neon tube 224 lights at the counts 2, 6, 10 . . . and is extinguished at the counts 4, 8, 12 . . . ; the corresponding indicator neon tube 226 of stage 214 lights at the counts 4, 12, 20 . . . and is extinguished at the counts 8, 16, 24 . . . ; the corresponding indicator neon tube 228 of stage 216 lights at the counts 8, 24 . . . and is extinguished at the counts 16, 32 . . . ; the corresponding indicator neon tube 230 of stage 218 lights at the counts 16, 48 . . . and is extinguished at the counts 32, 64 . . . ; the corresponding indicator neon tube 232 of stage 220 lights at the counts 32, 96 . . . and is extinguished at the counts 64, 128 . . . ; and the corresponding indicator neon tube 234 of the final stage 222 lights at the count 64, and is extinguished at the count 128. Thus a complete visual indication of counts is provided in binary manner from the counts zero to 127 inclusive. Depending upon the conveyor speed and the extent of absorption of the can content additional stages may be added yielding a finer degree of level discrimination.

As previously pointed out, a "full" can absorbs most of the intercepted beta radiation and therefore causes generation of but a few Geiger pulses during the gate time interval. The lower the level of the can content, the more pulses are generated with substantially linear relation even beyond the non-acceptable level. In FIGS. 3 and 4 the apparatus is connected for rejection at a non-acceptable level corresponding to a count of 32. To this end a reject line 235 is connected from the terminal L of stage 218 to the movable contact 2 of the light relay 80. With a lower minimum acceptable soap level the reject line 235 would be connected to the terminals L of stages 220 or 222 to produce rejection at the counts 64 and 128 respectively; conversely with a tighter tolerance on acceptability the reject line 235 would be connected to the terminal L of stage 216, for example, to produce rejection at the count 16.

For the subsequent description it will be assumed that line 235 is connected to the terminal L of stage 218 as shown. From the aforegoing description it will be readily inferred that the potential at terminal L of stage 218 rises for the first time from +100 volts to approximately +210 volts at the count 16, producing a positive pulse on the reject line 235. This positive pulse is transmitted via the reject line 235 to the No contact 2 of the light relay 80, thence over line 236 through a differentiating condenser 237 and differentiating resistor 238 to the grid 239 of the normally conducting tube 240 of the reject delay one-shot multivibrator 100. The leading edge of this positive pulse appears as a positive "spike" at the grid 239 (FIG. 5e) and as such has no effect on multivibrator 100, as the grid 239 is already at maximum saturation potential. At the count 32 the potential at terminal L of stage 218 drops to +100 volts once more, ending the positive pulse on line 235. This drop in potential arrives at grid 239 in the form of a negative trigger (FIG. 5e) and initiates timing action of the reject delay multivibrator 100.

The output of multivibrator 100 is derived from a voltage divider junction point 241 in the plate circuit of the normally conducting tube 240 and is therefore a positive pulse (FIG. 5f). This positive pulse is differentiated by means of a differentiating condenser 242 and resistor 243, which is connected to the grid 244 of the normally conducting tube 245 of the reject timer one-shot multivibrator 102. The leading edge of the pulse of multivibrator 100 appears (at count 32) as a positive spike at grid 244 and therefore has no effect, grid 244 being at maximum saturation potential. The trailing edge of the last-mentioned pulse however appears at grid 244 in the form of a negative spike and initiates timing action of the reject timer 102. A positive pulse (FIG. 5g) is produced in the plate circuit of the normally conducting tube 245 and is picked off from a voltage divider junction point 250 therein and direct-coupled through a voltage divider comprising resistors 252 and 254 to the grid 256 of a normally non-conducting reject driver triode 258, grid 256 being tied to the junction of resistors 252 and 254. The resistor 254 is turned to the −150 v. line. Direct coupling is employed to transmit reject pulses having long or short duration.

The cathode of triode 258 is grounded whereas its anode is connected through the coil 259 of a relay 260 to a positive direct voltage source +320 v. The positive pulse transmitted from junction point 250 is transmitted to the grid 256, causing plate current conduction in triode 258, energizing relay 260 and also the reject solenoid 34. An end of solenoid 34 is connected to a terminal 261 of a potential source V and its other end is connected to the No contact of relay 260. The movable contact of relay 260 is connected to the other terminal 262 of the voltage source V. With energization of solenoid 34 as a consequence of energization of relay 260, the deflection arm 26 is driven by means of connections 36 into the travel of the non-acceptable can rejecting it from the conveyor belt 18. At the termination of the pulse of the reject timer 102 triode 256 is once more cut off, the relay 260 and solenoid 34 are deenergized and the deflection arm 26 reverts to its normal position, all in readiness for rejection of the next can should it be likewise non-acceptable. A capacitor 263 shunts solenoid 34 to minimize sparking across the contacts of relay 260 upon openings and closing thereof.

The multivibrator 100 is provided to produce the proper time delay for arrival of a non-acceptable can at the reject station 22, and the reject timer 102 is provided to produce a pulse of sufficient duration to effect rejection. Since the reject delay multivibrator 100 is in its normal condition when the reject timer multivibrator 102 produces its timing pulse, the next can may be subjected to measurement at the inspection station 20 as expeditiously as possible, i.e. even while multivibrator 102 is producing its timing pulse, having due regard to the conveyor speed and time of action of the reject mechanism. Potentiometers 264 and 265 are provided for the reject delay multivibrator 100 and reject timer multivibrator 102 respectively for purposes of adjusting the timing intervals and to avoid interference between consecutive cans. These potentiometers are connected in a manner analogous to that of potentiometer 122 of the gate timer multivibrator 98. Where a long delay is necessary due to separation of stations 20 and 22, in the interest of avoiding interference between consecutive cans additional delay one-shot multivibrators are inserted between multivibrators 100 and 102. Under conditions of high conveyor speed or short separation of consecutive cans, the arm 26 is operated so as to momentarily come into contact with non-acceptable cans with sufficient impact to positively eject them from the conveyor belt. In such case the timing interval of the multivibrator 102 is selected to be of very short duration.

Thus it will be seen that the cans effective to produce 32 or more counts during the gate time interval are rejected and that the gate pulse must be necessarily of a duration longer than that required for 32 counts. The gate timing interval should be set to be at least somewhat shorter than the time interval of light interception to assure that the reject pulse on line 235 is transmitted to line 236 before the light relay 80 is deenergized. At the termination of the gate time interval the generation of Geiger pulses ceases and the Geiger tube 48 and quench tube 142 revert to their normal conditions. At the termination of the light interception the light relay 80 releases, the potential on reset line 196 drops from +150 volts derived from junction point 198 to the +70 volts of the junction point 84. The +70 volt potential is routed through the NC contact 1 of the light relay 80. The resistor 200 is sufficiently large in comparison with resistors 85, 86, 202 and 204 so as to produce substantially no loading effect thereon and maintain the voltage at junction points 84 and 198 respectively at +70 and +150 volts.

At the termination of the gate time interval some of the scales of 2 stages will be in the "abnormal" condition of having the left tube non-conducting and the right tube conducting. Accordingly, the terminals L of such stages will be at a potential of approximately +210 volts. With the deenergization of the light relay 80 the potential of the reset line 196 drops to +70 volts as pointed out, and the differential of 140 volts between +210 volts and +70 volts is sufficient to momentarily cause conduction through and light the reset neon tubes of the stages in the "abnormal" condition (FIG. 5h). The conduction is through the plate circuits of the left (normally conducting) tubes and therefore results in "flipping" action, restoring these stages to the normal condition and immediately extinguishing all the neon tubes. Thus it will be seen that the change in voltage on line 196 results in resetting of the scales of 2 in readiness for the next counting cycle.

In the event that a can is acceptable as for example the second can in FIG. 5 the count 32 is not reached by the end of the gate pulse and the reject delay multivibrator 100, the reject timer multivibrator 102, and the reject driver stage 258 are not actuated. The can proceeds unimpeded to the packaging station 24. To avoid spurious, false triggering of the reject delay multivibrator 100 upon the deenergization of the light relay 80, a high value resistor 266 is connected cross lines 235 and 236. In the absence of the resistor 266 line 236 would be left floating upon the release of the light relay 80 and spurious triggering might result. Where a count of 16 or more but less than 32 had been produced, upon resetting the positive pulse on reject line 235 which had commenced at the count 16 is terminated, but no triggering of the reject delay multivibrator 100 occurs. The resistor 266 attenuates the pulse and therefore its negative trailing edge to an extent sufficient to avoid triggering.

The aforedescribed apparatus has been operated at a rate of deposit of cans on the conveyor belt of 70 cans per minute with a conveyor speed of 7½" per second and a spacing between cans on the conveyor of approximately 1½ times the diameter of the cans. Under such condition of operation the level discrimination is better than ⅛" and the probability of rejection of completely full cans or non-rejection of empty cans is one in one million. Higher speeds are possible at somewhat reduced accuracy.

It should be understood that the aforegoing description has been presented by way of example and not by way of limitation, reference being had to the appended claims rather than the aforegoing description to determine the scope of the invention.

What is claimed is:

1. In canning machinery including means for conveying cans, previously subjected to filling, apparatus for measuring the level of the contents of said cans, comprising a source of penetrative radiation located at a measuring station and disposed so as to direct a radiant beam across the path of travel of said cans, radiation detecting counter means also located at said measuring station and disposed for reception of radiation so directed and unabsorbed by the contents of said cans and producing pulses representative in number of the level of content for each of said cans, means operatively connected to said counter means for digitally indicating said number thereby to reflect said level, means responsive to arrival and departure of a can at said station for respectively initiating and terminating the sequence of count pulses applicable to such can, and means responsive to said sequence termination for resetting said indicating means to readiness for indicating the level-representative-number for the next ensuing can.

2. In canning machinery including means for conveying cans previously subjected to filling, apparatus for monitoring the level of the contents of said cans comprising a source of penetrative radiation located at a measuring station and disposed so as to direct a radiant beam across the path of travel of said cans, radiation detecting counter means also located at said station and disposed for reception of radiation so directed and unabsorbed by the contents of said cans and adapted to produce pulses representative in number of the level of content for each of said cans, means responsive to arrival and departure of a can at said station respectively for enabling said counter means to produce a sequence of said pulses applicable to such can during the time interval such can intercepts said beam and for thereafter inhibiting said counter means thereby to terminate said sequence, means operatively connected to said counter means for digitally indicating said number thereby to reflect the level of a given can, rejection means responsive to production of a predeterminer number of pulses for a given can by said digital indicating means for rejecting said last-mentioned can from said conveying means, and means responsive to said termination of sequence for a given can for resetting said indicating means to readiness for indicating the level-representative-number for the next ensuing can.

3. In canning machinery including means for conveying cans, apparatus for monitoring the level of the contents of said cans comprising a source of penetrative radiation located at a measuring station and disposed so as to direct a radiant beam across the path of travel of said cans, a radiation counter tube also located at said station and disposed for reception of radiation so directed and unabsorbed by the contents of said cans and adapted to produce pulses representative in number of the level of content for each of said cans, gating means responsive to arrival and departure of a can at said station respectively for enabling said counter tube to produce a sequence of said pulses applicable to such can during the time interval any given can intercepts said beam and for thereafter inhibiting said counter means thereby to terminate said sequence, a binary scaler connected to said counter tube for reflecting the count of said pulses to a binary scale, means connected to said binary scaler to indicate said pulse count, means responsive to said binary scaler having counted a predetermined number of pulses for a given can for rejecting such can from said conveying means, and means responsive to the operation of said inhibiting means for resetting said binary scaler and indicating means to the count of zero in readiness for counting the pulses of the next ensuing can.

4. The combination as defined in claim 3 wherein the inhibiting means comprises a source of light disposed so as to direct a light beam across the path of travel of said cans, photoelectric means disposed so as to normally receive said light beam, and circuit means responsive to the normal reception by said photoelectric means and to interruption of said reception due to interception of the light beam by a can for respectively alternately inhibiting and enabling the operation of the counter tube.

References Cited in the file of this patent

UNITED STATES PATENTS

| | | |
|---|---|---|
| 1,114,529 | Rose | Oct. 20, 1914 |
| 2,529,081 | Hughes et al. | Nov. 7, 1950 |
| 2,590,057 | Wiegand | Mar. 18, 1952 |
| 2,635,747 | Hughes | Apr. 21, 1953 |
| 2,707,555 | Gaudin | May 3, 1955 |
| 2,732,503 | Jacobs | Jan. 24, 1956 |
| 2,742,150 | Rendel | Apr. 17, 1956 |
| 2,763,790 | Ohmart | Sept. 18, 1956 |
| 2,838,679 | Kraayeveld | June 10, 1958 |
| 2,883,551 | Zito | Apr. 21, 1959 |
| 2,944,667 | Stevens | July 12, 1960 |

FOREIGN PATENTS

| | | |
|---|---|---|
| 699,129 | Great Britain | Oct. 28, 1953 |
| 768,943 | Great Britain | Feb. 27, 1957 |

OTHER REFERENCES

"Beta Ray Thickness Gage for Sheet Steel" by Smith, Electronics, October 1947.

"Holds Fill Level to 1/32" With No Jam-Ups," by Schremp and Mendleson, Chemical Processing, February 1956.